(12) United States Patent
Niemelä

(10) Patent No.: US 9,779,267 B2
(45) Date of Patent: Oct. 3, 2017

(54) COMPUTER SECURITY METHOD AND APPARATUS

(75) Inventor: Jarno Niemelä, Espoo (FI)

(73) Assignee: F-Secure Oyj, Helsinki (FI)

( * ) Notice: Subject to any disclaimer, the term of this patent is extended or adjusted under 35 U.S.C. 154(b) by 716 days.

(21) Appl. No.: 12/587,522

(22) Filed: Oct. 7, 2009

(65) Prior Publication Data
US 2011/0082838 A1   Apr. 7, 2011

(51) Int. Cl.
| G06F 21/56 | (2013.01) |
| G06F 21/64 | (2013.01) |
| G06F 21/55 | (2013.01) |
| G06F 11/14 | (2006.01) |

(52) U.S. Cl.
CPC .......... *G06F 21/64* (2013.01); *G06F 11/1458* (2013.01); *G06F 21/55* (2013.01); *G06F 21/563* (2013.01); *G06F 21/566* (2013.01); *G06F 11/1451* (2013.01)

(58) Field of Classification Search
None
See application file for complete search history.

(56) References Cited

U.S. PATENT DOCUMENTS

| 4,827,478 A * | 5/1989 | Chan | 714/763 |
| 6,611,850 B1 * | 8/2003 | Shen | |
| 7,203,962 B1 | 4/2007 | Moran | 726/23 |
| 2004/0010732 A1 | 1/2004 | Oka | 714/13 |
| 2007/0240219 A1 * | 10/2007 | Tuvell et al. | 726/24 |
| 2011/0047618 A1 * | 2/2011 | Evans et al. | 726/23 |

FOREIGN PATENT DOCUMENTS

EP   1 202 148 A1   5/2002

OTHER PUBLICATIONS

Schneidermeyer, M., "Does rsync detect file corruption?", http://lists.samba.org, May 2009, 2 pgs.
Lunt, Teresa F., "Real-Time Intrusion Detection", IEEE 1989, pp. 348-353.
Bontchev, Vesselin, "Possible Virus Attacks Against Integrity Programs and How to Prevent Them", Proc. $2^{nd}$ Int. Virus Bulletin Conference, Sep. 1992, pp. 131-142.

* cited by examiner

*Primary Examiner* — Boris Gorney
(74) *Attorney, Agent, or Firm* — Harrington & Smith

(57) ABSTRACT

A method of controlling a process on a computer system for backing-up files stored in a primary storage medium, to a secondary storage medium. The method comprises monitoring a file system implemented on the computer system in order to detect write operations made by the file system to said primary storage medium. Upon detection of a write operation, the integrity of a file being written is verified and/or changes in the file identified with respect to a version of the file currently stored in the primary storage medium and which is being replaced. In the event that the integrity of a file being written by the file system is compromised, and/or any identified changes in the file are suspicious, then the file is identified to the back-up process such that automatic back-up of the file is inhibited.

15 Claims, 2 Drawing Sheets

COMPUTER SECURITY METHOD AND APPARATUS

TECHNICAL FIELD

The present invention relates to a computer security method and apparatus and in particular to such method and apparatus that employs a file backup mechanism.

BACKGROUND

It is common for computer systems, including individual home and office computers, computer networks, and mobile devices such as smart phones, to implement a backup mechanism to allow the recovery of important files in the event that the original files are lost. In some cases, a file may be backed up by copying the original file to another memory location within a given terminal. In others, a file may be copied to another storage medium on the same network, or to a remote storage medium via the Internet or a Wide Area Network.

An example backup service that is currently available is F-Secure™ Online Backup available from F-Secure Corporation, Helsinki, Finland. This product installs and runs a backup application on a client computer which, by default, copies all files and associated data and transmits these over a secure Internet link to a remote storage location. In the event that a file is lost or found to be corrupted on the client computer, a user can recover a copy of the file from the remote storage location.

In order to avoid the need to repeatedly copy all files from a given client computer to a backup storage location, either within the same computer or at another device, a backup application will typically monitor the local or "primary" memory to detect when changes to previously backed-up files occur. For example, the application may look at a file system timestamp that is included with the stored file by a computer's operating system, and which is updated with the current time whenever the file is modified. Only when a change in a timestamp is detected will the backup application copy the modified file and use it to overwrite a previously backed-up copy of the file. Other approaches do not rely upon a changing timestamp, and will backup files if any change in the original copy of the file is detected.

A problem that many computer users will have experienced is that of a clean and intact backup copy of a file being over-written by a corrupted version of the file. The original backup copy of the file is of course lost, and when the user attempts to restore the backup copy, all that can be retrieved is the corrupted copy which is generally of no use. It has been suggested—see http://lists.samba.org/archive/rsync/2009-May/023265.html—that such over-writing of a clean and intact file with a corrupt file may be prevented by not backing-up the file if only a change in the file is detected whilst the timestamp does not change. This approach however cannot protect a system when a file is modified and validly re-saved with a new timestamp, but where the file is broken or maliciously altered.

SUMMARY

It is an object of the present invention to reduce the risk of a correctly backed-up file being overwritten by a corrupted or broken file, or by a file that has been maliciously altered. This is achieved by monitoring the changes in files being saved, or monitoring patterns of write operations, or checking file integrity.

According to a first aspect of the present invention there is provided a method of controlling a process on a computer system for backing-up files stored in a primary storage medium, to a secondary storage medium. The method comprises monitoring a file system implemented on the computer system in order to detect write operations made by the file system to said primary storage medium. Upon detection of a write operation, the integrity of a file being written is verified and/or changes in the file identified with respect to a version of the file currently stored in the primary storage medium and which is being replaced. In the event that the integrity of a file being written by the file system is compromised, and/or any identified changes in the file are suspicious, then the file is identified to the back-up process such that automatic back-up of the file is inhibited.

Embodiments of the invention may help to reduce the risk of files and other data being irreplaceably lost. They may also help to identify the presence of malware on the system, or the occurrence of a system fault.

The method may comprise verifying the integrity of a file being written to the primary storage medium by applying an integrity mechanism that is specific to the file type. For example, this may involve calculating a checksum across the file or part of the file, or decompressing the file contents.

The method may comprise identifying changes in the file with respect to a version of the file currently stored in the primary storage medium, the step of identifying changes comprising identifying changes in the file type.

The method may comprise monitoring said file system in order to detect patterns in multiple write operations that are indicative of the activity of malware on the computer system and/or of faults in the computer system. For example, this may comprise detecting the occurrence of one or more of the following patterns:

- the replacement of multiple files stored in the primary storage medium with files containing substantially identical content;
- the replacement of multiple files stored in the primary storage medium and having different file types, with files having the same file type;
- the replacement of files having different file types where the write operations are initiated by a single process; and
- the replacement of multiple files with files having their integrity compromised.

The method may comprise reporting file system write operations to said back-up process including identifying to that process the files that have been written, wherein the back-up process confirms that a write operation has been performed in respect of a given file before backing-up that file to said secondary storage medium.

According to a second aspect of the present invention there is provided a method of controlling a process on a computer system for backing-up files stored in a primary storage medium, to a secondary storage medium. The method comprises monitoring a file system implemented on the computer system in order to detect patterns in multiple write operations made to said primary storage medium that are indicative of the activity of malware on the computer system and/or of faults in the computer system. Upon detection of such a pattern, automatic back-up of files associated with the pattern to said secondary storage medium is to be inhibited by identifying the files to the back-up process.

The method may comprise detecting the occurrence of one or more of the following patterns:

the replacement of multiple files stored in the primary storage medium with files containing substantially identical content;

the replacement of multiple files stored in the primary storage medium and having different file types, with files having the same file type;

the replacement of files having different file types where the write operations are initiated by a single process; and the replacement of multiple files with files having their integrity compromised.

According to a third aspect of the present invention there is provided a method of controlling a process on a computer system for backing-up files stored in a primary storage medium, to a secondary storage medium. The method comprises, prior to backing-up a file stored in said primary storage medium, verifying the integrity of the file using an integrity mechanism associated with the file type of the file and/or identifying changes in the file type of the file with respect to an existing saved version of the file. In the event that the integrity of the file is compromised, and/or any identified changes in the file type of the file are suspicious, then back-up of the file is inhibited. The step of verifying the integrity of the file using an integrity mechanism comprising calculating a checksum across the file or part of the file, or decompressing the file contents.

According to a fourth aspect of the present invention there is provided a computer having a primary storage medium and either a secondary storage medium or a network interface towards a secondary storage medium. The computer further comprises a file system unit for storing and organising files on said primary storage medium, and a file backup unit for backing-up files stored in said primary storage medium, to said secondary storage medium. A monitoring unit is provided for monitoring said file system unit in order to detect write operations made by the file system unit to said primary storage medium.

A verification unit is provided for verifying the integrity of a file being written and/or identifying changes in the file with respect to a version of the file currently stored in the primary storage medium and which is being replaced. A back-up prevention unit is provided and configured, in the event that the integrity of a file being written by the file system is compromised and/or any identified changes in the file are suspicious, to identify to the backup unit that automatic back-up of the file is to be inhibited.

According to a fifth aspect of the present invention there is provided a computer having a primary storage medium and either a secondary storage medium or a network interface towards a secondary storage medium. The computer further comprises a file system unit for storing and organising files on said primary storage medium, and a file backup unit for backing-up files stored in said primary storage medium, to said secondary storage medium.

A monitoring unit is provided for monitoring said file system unit in order to detect patterns in multiple write operations that are indicative of the activity of malware on the computer system and/or of faults in the computer system, with a back-up prevention unit being provided and configured, in the event that the such a pattern is detected, to identify to the backup unit that automatic back-up of files associated with the pattern is to be inhibited.

According to a sixth aspect of the present invention there is provided a computer having a primary storage medium and either a secondary storage medium or a network interface towards a secondary storage medium. The computer further comprises a file system unit for storing and organising files on said primary storage medium, and a file backup unit for backing-up files stored in said primary storage medium, to said secondary storage medium.

A verification unit is provided for verifying the integrity of a file being written to said primary storage medium by said file system unit using an integrity mechanism associated with the file type of the file, and/or identifying changes in the file type of the file with respect to an existing saved version of the file. A back-up prevention unit is also provided and configured, in the event that the integrity of the file is compromised, and/or any identified changes in the file type of the file are suspicious, to inhibit back-up of the file.

According to a seventh aspect of the present invention there is provided a computer program for causing a computer to perform the following steps:

monitor a file system implemented on the computer in order to detect write operations made by a file system to a primary storage medium;

upon detection of a write operation, verify the integrity of a file being written and/or identify changes in the file with respect to a version of the file currently stored in the primary storage medium and which is being replaced; and in the event that the integrity of a file being written by the file system is compromised, and/or any identified changes in the file are suspicious, then identifying to the back-up process that automatic back-up of the file to a secondary storage medium is to be inhibited.

According to an eighth aspect of the present invention there is provided a computer storage medium having stored thereon a program according to the above seventh aspect of the invention.

According to a ninth aspect of the present invention there is provided a computer program for causing a computer to perform the following steps:

monitor a file system implemented on the computer in order to detect patterns in multiple write operations to a primary storage medium that are indicative of the activity of malware on the computer system and/or of faults in the computer system; and upon detection of such a pattern, identify to the back-up process that automatic back-up of files associated with the pattern to a secondary storage medium is to be inhibited.

According to a tenth aspect of the present invention there is provided a computer storage medium having stored thereon a program according to the above ninth aspect of the invention.

According to an eleventh aspect of the present invention there is provided a computer program for causing a computer to perform the following steps:

prior to backing-up a file stored in said primary storage medium, verify the integrity of the file using an integrity mechanism associated with the file type of the file and/or identify changes in the file type of the file with respect to an existing saved version of the file; and in the event that the integrity of the file is compromised, and/or any identified changes in the file type of the file are suspicious, inhibit back-up of the file.

According to a twelfth aspect of the present invention there is provided a computer storage medium having stored thereon a program according to the above eleventh aspect of the invention.

DETAILED DESCRIPTION

Figure 1:
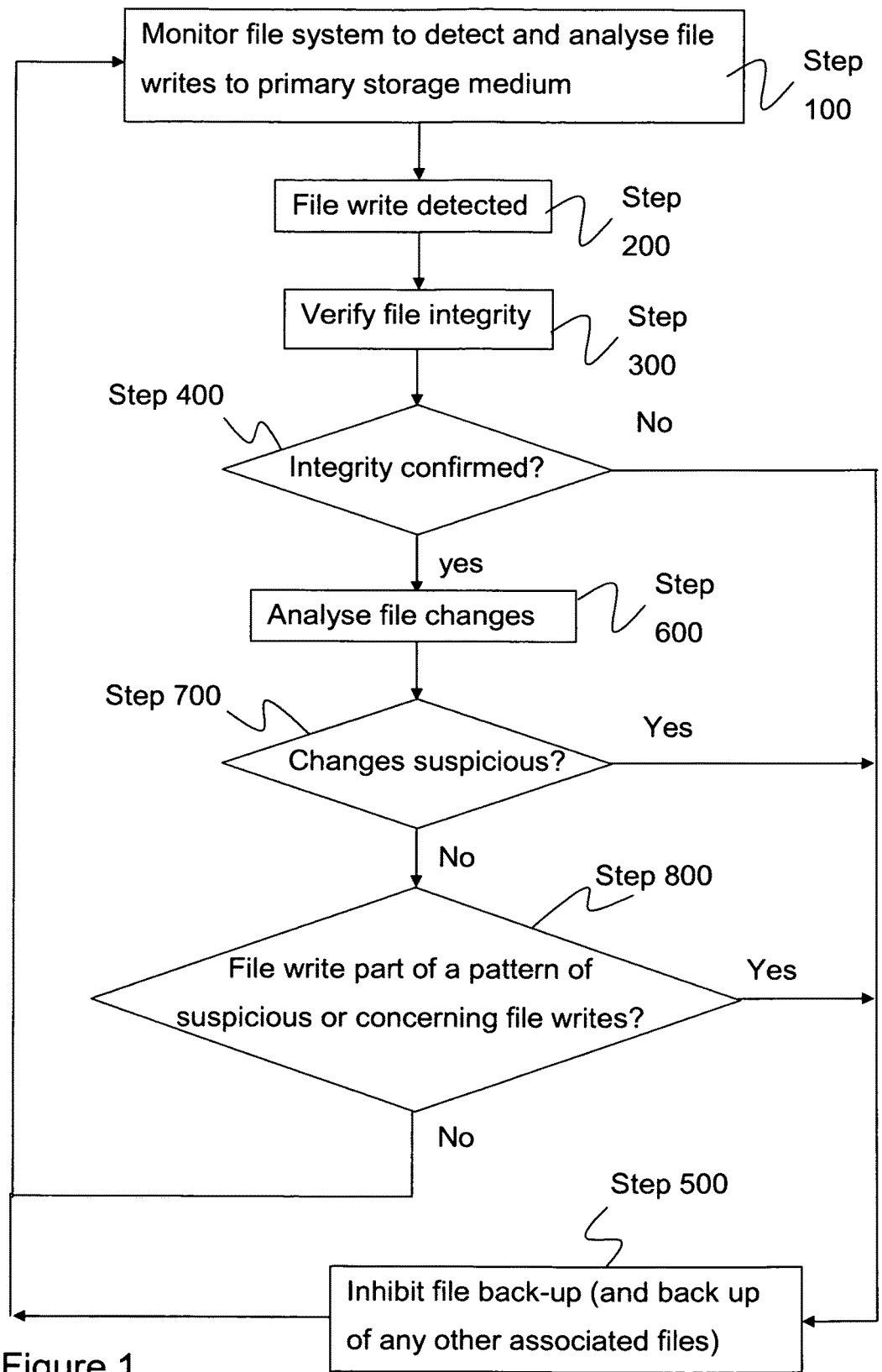
FIG. 1 is a flow diagram illustrating a process for inhibiting file backup in the event that a file write operation is suspicious or forms part of a suspicious pattern.

As has been discussed above, conventional file backup applications and procedures tend not to be very sophisticated in so far as they perform no, or only very limited checks on files before making a backup. Such approaches give rise to a high risk that valid backup files will be overwritten with corrupted, broken, or maliciously altered files. Whilst many computer systems are provided with file system monitoring tools including but not limited to anti-virus and other malware detection applications, these tend to be concerned primarily with the malfunctioning files themselves, e.g. the malware, rather than with files that have been unintentionally or maliciously altered. An anti-virus application may, for example, "lock" a malware file once detected to prevent that file being accesses, thus effectively preventing backing-up of the malware or infected file. It will not however lock files that has been maliciously altered before the malware has been detected. As such, valuable user data may be lost.

An example approach is proposed here that links a file backup process to ongoing file monitoring and security checks so as to alert the backup procedure when suspicious file modifications to primary data are detected, thereby preventing the backup process from backing-up changed files, at least until such time as the system or user has approved the changed files.

Many commercially available software applications, including for example Microsoft Word™ and Adobe Acrobat™, are configured to implement a file integrity mechanism. For example, such a mechanism might include within a file header a checksum calculated across the file data. An algorithm for implementing an integrity mechanism may be in the public domain or, if not, at least a mechanism for validating the correct use of an integrity mechanism may be available. An approach to minimising the risk of backing-up corrupt or broken files may take advantage of such known and used integrity mechanisms. Whenever a file backup process detects a change in a file, and which would conventionally cause the original file to be copied and saved to a backup location, the backup process first uses the integrity mechanism to determine whether or not the file data is correct. For example, the process may use the appropriate algorithm to generate a checksum, and will compare the generated checksum against that saved in the file or file header. Only if the integrity check proves that the file is intact will a backup copy be made and saved, and any earlier backup copy over-written. If the file is found not to be intact, no backup copy is saved, and an alert is issued to the computer user.

By way of example, one might consider the well known Portable Network Graphics (PNG) file format. A PNG file consists of a series of "chunks", each of which comprises data and a Cyclic Redundancy Code/Checksum. By checking that the CRC codes within the file are correct, the integrity of the file can be verified. In general, most commonly used file formats use compression and contain integrity check information in the compressed stream that can be reused for the purpose of integrity checking. One readily apparent mechanism to implement such an integrity check is to implement a "player" for the file format to see if the file can be read correctly.

In some case, the detection of a broken or corrupted file using an integrity mechanism may be indicative of the presence of malware on the computer system, or that the system is undergoing some other form of attack. This may be the case where a large number of files are observed to be broken or corrupted at substantially the same time, or where some other suspicious pattern is observed. For example, this behaviour may indicate the presence of a Gpcode malware which encrypts user files and requests that a ransom be paid to reverse the process. The backup process may be linked to an anti-virus process or more general security process in order to report the suspicious and trigger appropriate activity on the part of the anti-virus or security process.

A pattern present in detected broken or corrupted files may, alternatively, be indicative of malfunctioning hardware and/or software (including malfunctioning of any anti-virus software). As such, the backup process may notify such behaviour to other system process in order to further report, identify, and possibly resolve the system faults.

Inter-operation of the backup process and the anti-virus or security process may be advantageously employed in order to prevent backups being made when suspicious behaviours are detected by the latter. As has already been discussed, an anti-virus or security process running on a computer system may be configured to detect behaviour that is indicative of the presence of malware on the system. This may require that the anti-virus or security process monitor operations of the file system. Typically, a computer operating system incorporates or makes use of a file system to store and organise files and associated data. An example file system is the File Allocation Table (FAT) file system used by Microsoft Windows. Monitoring of the file system may be done in real-time to detect one or more of the following behaviours:

Write operations carried out by a single process, e.g. "word.exe" running on a system, on different types of files.

Multiple files being replaced with identical content.

File type of files being changed. For example, an MP3 file are being replaced with a portable executable (PE) file.

Whilst traditional processes have used the occurrence of such behaviours to identify malware that is the source of the behaviour, it is possible to identify the "benign" files that have nonetheless been modified by the malware, and report these to the backup process. The backup process can maintain a record of such reported files and exclude these when the next backup occurs (typically backups occur at regular, scheduled times or time intervals).

The anti-virus or security process and the backup process may further interact such that the former provides the latter with a list of (recent) file write operations, i.e. a list of files to which the file system has performed valid write operations. When the backup process detects that a file has changed, before backing-up the file the backup process confirms that the file name appears in the list received from the anti-virus or security process. If the file name does appear, backup of the file is carried out. If not, no backup is performed and a report is made to the anti-virus or security process and/or an alert issued to the user or system administrator. Such a behaviour indicates to the anti-virus or security application that the system is misbehaving and that the file change may have occurred as a result of malware, e.g. rootkits or other "stealth" malware.

FIG. 1 is a flow diagram illustrating a process for minimising the risk of back-up corruption, and incorporating certain of the approaches presented above. Step 100 provides for substantially continuous monitoring of the file write system of a computer. This monitoring may be carried out by a security process operating on the computer, e.g. an anti-virus application. In the event that a file write operation is detected at step 200, then at step 300 a file integrity check is performed on the file to be written. Preferably, the file write operation is suspended during this check. If, at step 400, the integrity check is successful, the process continues to step 600. If, however, the integrity check determines that the file is corrupt or otherwise broken, at step 500 the file is identified to indicate that back-up of the file should be inhibited. The file may still be written to the primary storage medium.

At step 600, the file is analysed to determine whether or not any of the changes being made to the file are suspicious. The comparison may be made against the file version currently stored in the primary storage medium, or possible against a version retrieved from the secondary storage medium. If this check succeeds at step 700, the process continues to the next check at step 800. On the other hand, if the changes identify the file as suspicious, at step 500, back-up the file is inhibited.

At step 800, the characteristics of the ongoing write operation are analysed together with a recorded history of write operations, in order to discern whether or not the write operation forms part of a pattern of write operations that is suspicious. If this is the case, at step 500, the file is identified (to the back-up process) to prevent back-up of the file. Other files that form part of the same pattern may also be identified to the back-up process (although a back-up of those files may already have occurred). If no suspicious pattern is detected, the process returns to continuous monitoring at step 100.

Figure 2:
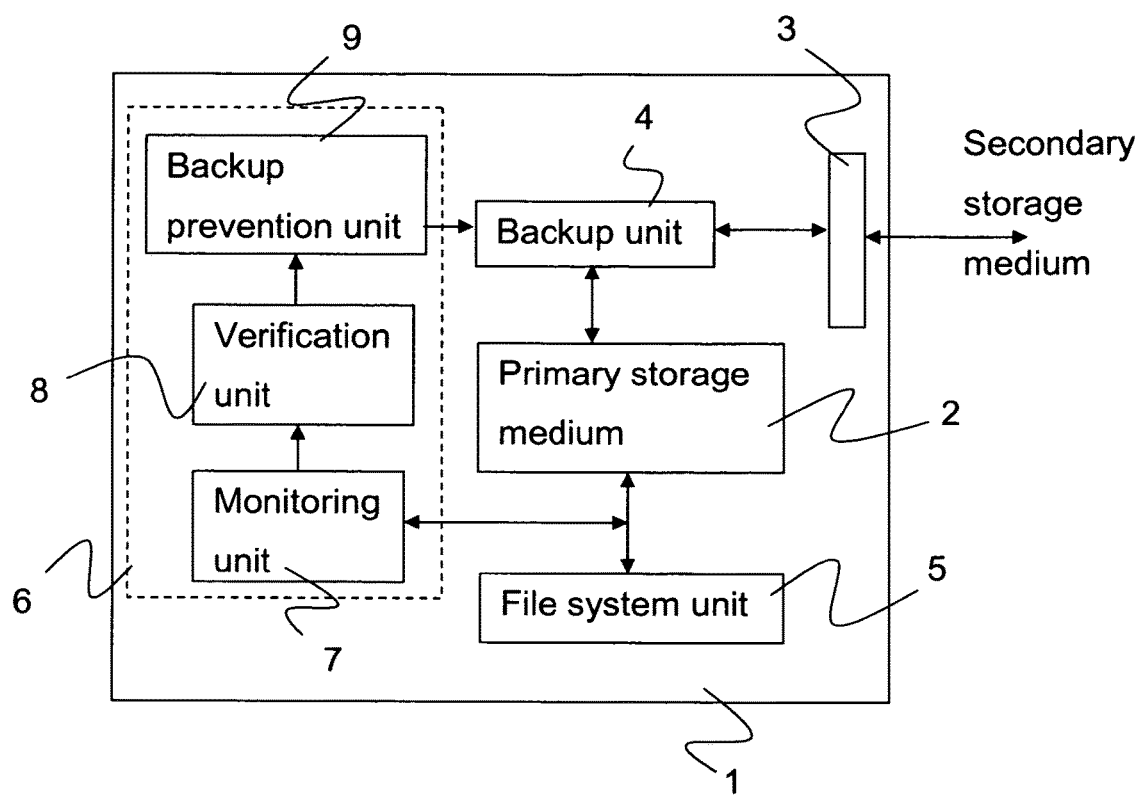
FIG. 2 is a block diagram illustrating a computer configured to carry out the process of FIG. 1.

FIG. 2 illustrates schematically a computer 1 configured to implement certain file security and integrity procedures. The computer may be a pc, server, mobile phone, etc. The computer comprises a primary storage medium 2, which may be, for example, a hard disk drive or Random Access Memory (RAM), and an interface 3 for connecting the computer to a network, for example the Internet and/or a LAN. Via this network, the computer can interact with a remote, secondary storage medium (not shown), such as a web server.

The computer 1 further comprises a backup unit 4 coupled to the primary storage medium 2 and the interface 3, such that files and associated data may be transferred from the primary storage medium 2 to the (remote) secondary storage medium for safe keeping. The computer further comprises a file system 5, which may be part of a standard operating system, e.g. Microsoft Windows. A security process 6, which may be for example an anti-virus process, comprises a monitoring unit 7 that is configured to monitor the file system 5 to detect write operations made by the file system to the primary storage medium. Upon detection of such an event, the monitoring unit signals the event to a verification unit 8. It may also obtain a copy of the file and provide this to the verification unit, or may identify a location where the file is stored.

The verification unit carries out the tests illustrated in FIG. 1, including checking the file integrity. If the file is considered suspicious, or forms part of a pattern of suspicious write operations, the verification unit signals this to a backup prevention unit 9, which in turn identifies the file to the backup unit 4. The backup unit adds the file or files to a backup "blacklist". Files identified in the blacklist are not backup up, and so any copy stored in the secondary storage medium remain uncorrupted.

The components of the computer illustrated in FIG. 2 may be implemented by way of appropriate computer programmes making use of memories and processors and other hardware components of the computer.

It will be appreciated by the person of skill in the art that various modifications may be made to the above described embodiments without departing from the scope of the present invention.

The invention claimed is:

1. A method of controlling a process on a computer system for backing-up files stored in a primary storage medium, to a secondary storage medium, the method comprising:
monitoring a file system implemented on the computer system in order to detect commencement of write operations made by the file system to said primary storage medium;
upon detection of commencement of a write operation, verifying integrity of a file being written by applying an integrity mechanism that is specific to a file type of the file using only information contained within the file and/or identifying suspicious changes in the file with respect to a version of the file currently stored in the primary storage medium and which is being replaced; and
in the event that the integrity of the file being written by the file system is compromised, and/or any suspicious changes in the file are identified, then identifying to the back-up process that subsequent automatic back-up of the file is to be inhibited; and
subsequently performing a back-up of files including copying files from the primary storage medium to the secondary storage medium excepting those files for which back-up is inhibited.

2. The method according to claim 1, wherein applying said integrity mechanism comprises calculating a checksum across the file or part of the file, or decompressing the file contents.

3. The method according to claim 1, comprising identifying suspicious changes in the file with respect to a version of the file currently stored in the primary storage medium, the step of identifying suspicious changes comprising identifying changes in the file type.

4. The method according to claim 1, comprising monitoring said file system in order to detect patterns in multiple write operations that are indicative of the activity of malware on the computer system and/or of faults in the computer system.

5. The method according to claim 4, comprising detecting the occurrence of one or more of the following patterns:
replacement of multiple files stored in the primary storage medium with files containing substantially identical content;
replacement of multiple files stored in the primary storage medium and having different file types, with files having a same file type;
replacement of files having different file types where the write operations are initiated by a single process; and
replacement of multiple files with files having their integrity compromised.

6. The method according to claim 1, comprising reporting file system write operations to said back-up process including identifying to that process the files that have been written, wherein the back-up process confirms that a write operation has been performed in respect of a given file before backing-up that file to said secondary storage medium.

7. The method according to claim 1, comprising the step of concurrently with the file being written to said primary storage medium applying an integrity mechanism comparing the file being written with respect to a version of the file currently stored in the primary storage medium and which is being replaced thereby.

8. The method according to claim 1, comprising the step of suspending the file system implemented on the computer system upon detection of a write operation while verifying integrity of the file being written to said primary storage medium.

9. A method of controlling a process on a computer system for backing-up files stored in a primary storage medium, to a secondary storage medium, the method comprising:
monitoring a file system implemented on the computer system in order to detect patterns in multiple write operations made to said primary storage medium that are indicative of the activity of malware on the computer system and/or of faults in the computer system;
upon detection of such a pattern, identifying to the back-up process that subsequent automatic back-up of files associated with the pattern to said secondary storage medium is to be inhibited; and
subsequently performing a back-up of files including copying files from the primary storage medium to the secondary storage medium excepting those files for which back-up is inhibited.

10. The method according to claim 9, comprising detecting the occurrence of one or more of the following patterns:
replacement of multiple files stored in the primary storage medium with files containing substantially identical content;
replacement of multiple files stored in the primary storage medium and having different file types, with files having a same file type;
replacement of files having different file types where the write operations are initiated by a single process; and
replacement of multiple files with files having their integrity compromised.

11. A computer having a primary storage medium and either a secondary storage medium or a network interface towards a secondary storage medium, the computer further comprising:
a file system unit for storing and organizing files on said primary storage medium;
a file backup unit for backing-up files stored in said primary storage medium, to said secondary storage medium, excepting files for which backup is inhibited;
a monitoring unit for monitoring said file system unit in order to detect commencement of write operations made by the file system unit to said primary storage medium;
a verification unit for verifying integrity of a file being written by applying an integrity mechanism that is specific to a file type of the file using only information contained within the file and/or identifying suspicious changes in the file with respect to a version of the file currently stored in the primary storage medium and which is being replaced; and
a back-up prevention unit configured, in the event that the integrity of the file being written by the file system is compromised and/or any suspicious changes in the file are identified, to identify to the backup unit that subsequent automatic back-up of the file is to be inhibited.

12. A computer having a primary storage medium and either a secondary storage medium or a network interface towards a secondary storage medium, the computer further comprising:
a file system unit for storing and organizing files on said primary storage medium;
a file backup unit for backing-up files stored in said primary storage medium, to said secondary storage medium, excepting files for which backup is inhibited;
a monitoring unit for monitoring said file system unit in order to detect patterns in multiple write operations that are indicative of the activity of malware on the computer system and/or of faults in the computer system; and
a back-up prevention unit configured, in the event that the such a pattern is detected, to identify to the backup unit that subsequent automatic back-up of files associated with the pattern is to be inhibited.

13. A non-transitory computer storage medium having stored thereon a computer program for causing a computer to perform the following steps:
monitor a file system implemented on the computer in order to detect commencement of write operations made by a file system to a primary storage medium;
upon detecting commencement of a write operation, verify integrity of a file being written by applying an integrity mechanism that is specific to a file type of the file using only information contained within the file and/or identify suspicious changes in the file with respect to a version of the file currently stored in the primary storage medium and which is being replaced;
in the event that the integrity of the file being written by the file system is compromised, and/or any suspicious changes in the file are identified, then identifying to the back-up process that subsequent automatic back-up of the file to a secondary storage medium is to be inhibited; and
subsequently performing a back-up of files including copying files from the primary storage medium to the secondary storage medium excepting those files for which back-up is inhibited.

14. A non-transitory computer storage medium having stored thereon a computer program for causing a computer to perform the following steps:
monitor a file system implemented on the computer in order to detect patterns in multiple write operations to a primary storage medium that are indicative of the activity of malware on the computer system and/or of faults in the computer system;
upon detection of such a pattern, identify to the back-up process that subsequent automatic back-up of files associated with the pattern to a secondary storage medium is to be inhibited; and
subsequently performing a back-up of files including copying files from the primary storage medium to the secondary storage medium excepting those files for which back-up is inhibited.

15. A method of controlling a process on a computer system for backing-up files stored in a primary storage medium, to a secondary storage medium, the method comprising:
monitoring a file system implemented on the computer system in order to detect commencement of write operations made by the file system to said primary storage medium;
upon detecting commencement of a write operation, verifying integrity of a file being written to said primary storage medium by applying an integrity mechanism that is specific to a file type of the file using only information contained within the file and/or identifying suspicious changes in the file with respect to a version of the file currently stored in the primary storage medium and which is being replaced within said primary storage medium;

in the event that the integrity of the file being written by the file system is compromised, and/or any suspicious changes in the file are identified, then identifying to the back-up process that subsequent automatic back-up of the file is to be inhibited; and subsequently performing a back-up of files including copying files from the primary storage medium to the secondary storage medium excepting those files for which back-up is inhibited.

\* \* \* \* \*